United States Patent [19]

Sawyer

[11] 4,009,428
[45] Feb. 22, 1977

[54] CONTROL SYSTEM FOR MAGNETIC POSITIONING DEVICE

[76] Inventor: Bruce A. Sawyer, 20120 Allentown Drive, Woodland Hills, Calif. 91364

[22] Filed: Jan. 15, 1973

[21] Appl. No.: 323,387

Related U.S. Application Data

[63] Continuation of Ser. No. 36,177, May 11, 1970, abandoned.

[52] U.S. Cl. .............................. 318/571; 318/687; 318/696
[51] Int. Cl.² ......................................... G05B 19/40
[58] Field of Search ............. 318/38, 12, 138, 561, 318/571, 687, 696

[56] References Cited

UNITED STATES PATENTS

| | | | |
|---|---|---|---|
| 3,457,482 | 7/1969 | Sawyer | 318/38 |
| 3,523,230 | 8/1970 | York | 318/138 |
| 3,535,604 | 10/1970 | Madsen et al. | 318/138 |
| 3,553,549 | 1/1971 | Leenhouts | 318/138 |

Primary Examiner—Benjamin Dobeck
Attorney, Agent, or Firm—Ellsworth R. Roston

[57] ABSTRACT

A control system for controlling the relative movement of a head member over a surface such as a plate member in accordance with digital input information. The head member and the surface form a linear, two-axis synchronous motor and the input signal to the head member is controlled to be a translating field vector to produce movement of the head member relative to the surface. The phase of the translating field vector is controlled to lead or lag the position vector of the surface by an electrical angle which is a direction function of the acceleration or deceleration required. An initial acceleration is used to bring the head member up to the desired terminal speed as quickly as possible and with the head then moved at a constant speed until a point when a signal is applied to produce a deceleration to slow down the head so that the head may be stopped at the position on the surface. Additional acceleration and deceleration vectors are provided to control the movement of the head member. The signal applied to the head member may be an analog signal formed as an integrated value from the digital input information.

25 Claims, 11 Drawing Figures

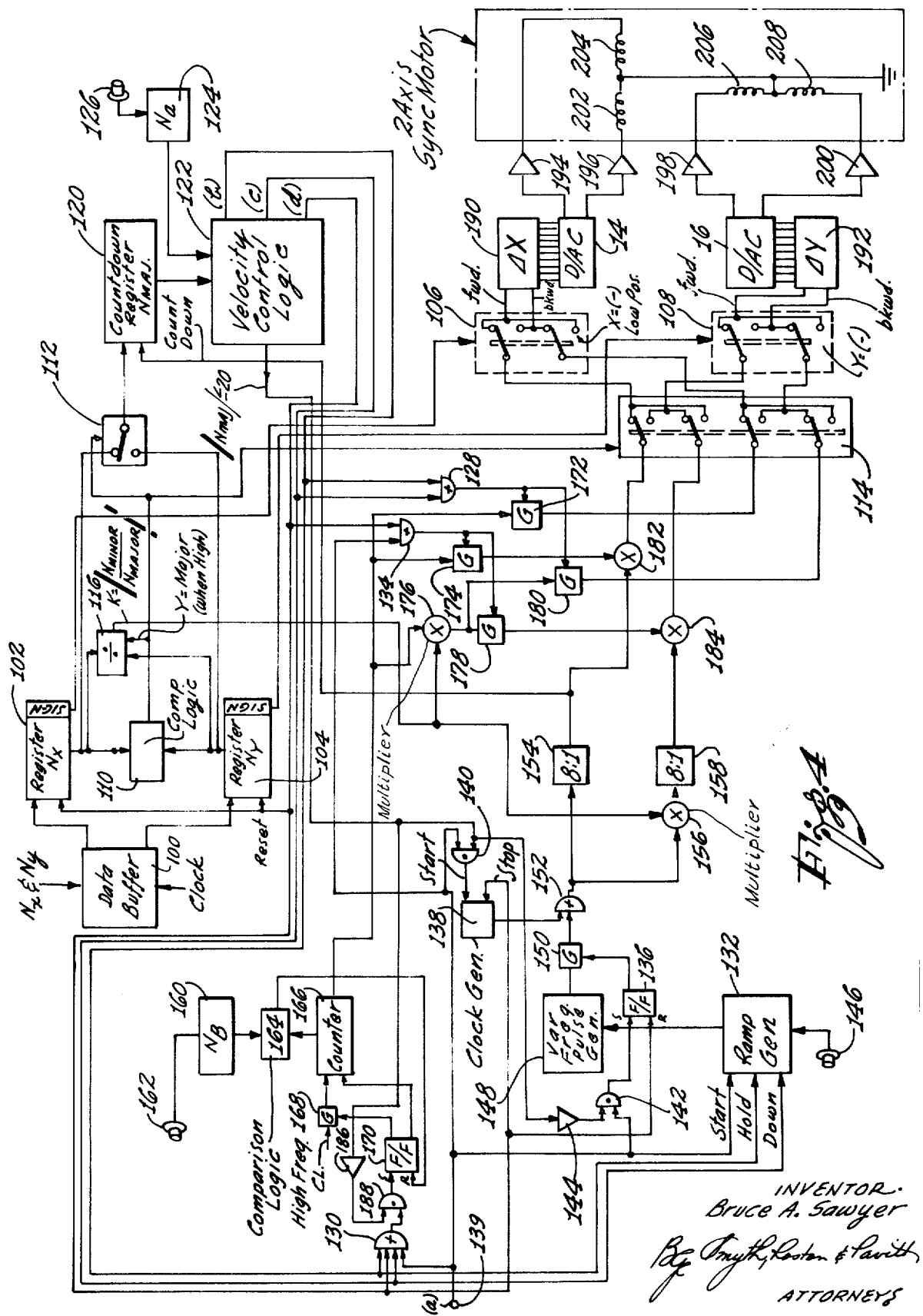

Fig. 5 (Velocity Control Logic) -122-

CONTROL SYSTEM FOR MAGNETIC POSITIONING DEVICE

This is a continuation of my application Ser. No. 36,177, filed May 11, 1970, which is abandoned.

The present invention relates to a control system for a magnetic positioning device of the type shown in U.S. Pat. Nos. 3,376,578 issued Apr. 2, 1968, and 3,457,482 issued July 22, 1969, both patents listing Bruce A. Sawyer as the inventor.

U.S. Pat. Nos. 3,376,578 and 3,457,482 disclose a magnetic positioning device including a head member for moving relative to a plate member, which head member carries a marking tool for plotting data on a sheet of paper positioned intermediate the head member and the plate member. It is to be appreciated that the head member may carry other devices other than a marking tool and that the head member may be used to provide for a readout of information rather than for plotting information.

The head member includes sets of magnets and wherein each set of magnets includes a plurality of individual magnets. The present invention, although described with reference to a two-phase magnetic positioning device as shown in U.S. Pat. No. 3,457,482 may also be designed to operate with other types of head members such as the hed member shown in U.S. Pat. No. 3,376,578, and conventional rotary synchronous motors driving translating converting mechanisms such as lead screws, drums, etc.

Specifically, the present invention is directed to a control system for controlling the signals applied to the head member to produce an improved movement of the head member over the plate member. Specifically, the present invention provides for an analog signal derived from the digital data information to control the movement of the head member and with a specific control of acceleration and deceleration to provide for rapid movements of the head member to thereby increase the speed of operation of the magnetic positioning device.

The magnetic head member, in combination with the plate member, may be considered to be a two-axis linear synchronous motor which provides for independent changes in the position of the head member in both the X and Y directions of the plate member. Specifically, the digital data information relating to the change in position of the head member may be converted to an analog signal which analog signal is applied to the coils contained in the head member to produce a translating field vector in the head member relative to the plate member. The phase of the translating field vector should lead or lag the position vector of the plate member by an electrical angle which is a direct function of the acceleration or deceleration required to produce the optimum movement of the head member.

Specifically, for a typical straight line plot, the translating field vector should be instantaneously positioned to provide for an acceleration of the head member. When the head member has reached a desired terminal speed, the phase angle of the translating field vector is changed by rotating it in the opposite direction to thereby reduce the acceleration of the head member to zero. The translating field vector is now controlled to rotate at a constant rate in the desired direction to provide for a movement of the head member at the desired constant speed.

The deceleration of the head member is provided for in a manner which is the reverse of the acceleration. Specifically, at the proper position the phase angle of the translating field vector is changed by rotating it to provide for a deceleration of the head member until the velocity of the head member is zero. At this time, the phase angle of the translating field vector is changed by rotating it to counteract the deceleration so as to quickly stop any movement of the head member and to thereby prevent overshoot and any resultant oscillation or hunting. The changes in the trnslating field vector which are used to advance or retard the electrical angle and thereby provide changes in the acceleration and deceleration of the head mamber are digital signals which are called "control bursts." In the present invention the control of the acceleration and deceleration are provided as digital signals, which digital signals are then converted to analog signals, but it is to be appreciated that the control of the acceleration and deceleration may be provided directly to the analog signals.

The present invention also includes the use of first overriding signals to control the points of acceleration and deceleration of the head member when the input data information provides for a total movement less than a particular minimum and, in addition, the present invention provides for a second override signal when the input data information provides for a very short movement of the head member.

It is also to be appreciated that, although the invention is described with reference to the conversion of the digital data to an analog signal to control the movement of the head member, the control of the head member may be accomplished directly by appropriately applying the digital information to the head member. Also, it is to be appreciated that the use of an analog signal as the input signals to the head member may be used independently of the use of the control bursts for acceleration and deceleration.

A clearer understanding of the invention will be had with reference to the following description and drawings wherein:

FIG. 4 illustrates a schematic of a control system to provide the desired control for the magnetic head member;

FIG. 5 illustrates in greater detail the velocity control logic of FIG. 4;

Figure 1:
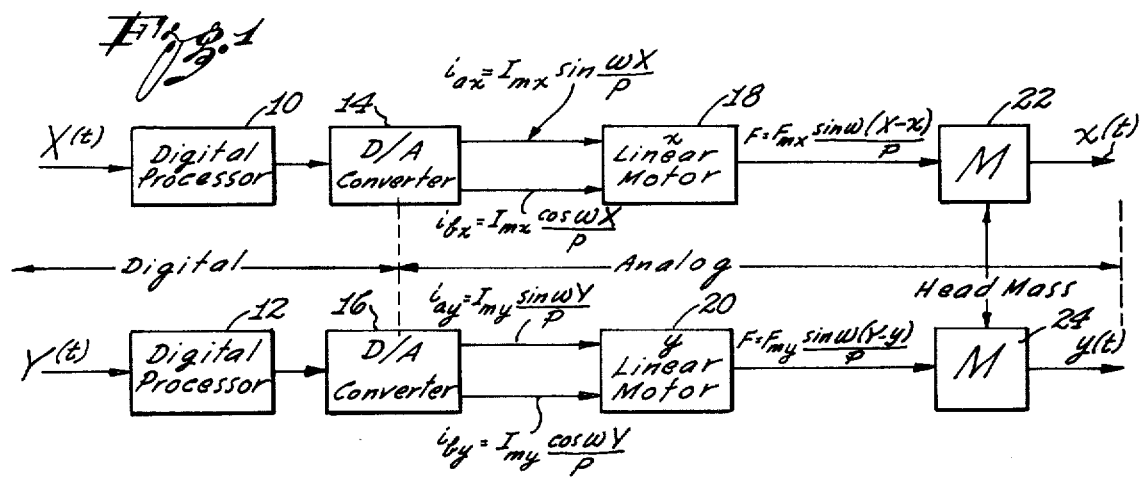
FIG. 1 illustrates a generalized block diagram of a basic control system of the present invention.

In FIG. 1, a generalized control system is shown which represents the general method of converting from digital information to analog information to control the head member. Specifically, digital information represented by $X(t)$ and $Y(t)$ is fed to digital processors 10 and 12. The digital information may be processed in a desired manner which will be explained with reference to FIGS. 4 and 5 so as to provide for control bursts of acceleration and deceleration at appropriate points. The outputs from the digital processors 10 and 12 are fed into digital analog converters 14 and 16. The digital analog converters provide for analog output signals $i_a$ and $i_b$ which are sine-cosine functions of the input information and have the values $$i_{ax} = I_m \sin(\omega X/p)$$

$$i_{bx} = I_m \cos(\omega X/p)$$

for the X axis and similar values for the Y axis where $I_m$ is the maximum values of the current, $\omega$ is $2\pi$ and $p$ is the pitch between the magnetic increments.

The outputs from the digital analog converters 14 and 16 are shown in FIG. 1 to be the sine-cosine functions, which sine-cosine functions are supplied to idealized linear motors 18 and 20. The motors 18 and 20 represent the portions of the head members which provide the driving force for the head members in the X and Y directions. The output force from the motors 18 and 20 is as shown in FIG. 1 and provides for a movement of the head mass shown in 22 and 24, wherein M represents mass.

The structure illustrated by the blocks 18 through 24 represent the head member illustrated in U.S. Pat. No. 3,457,482. The movement of the head member is shown as the output from the blocks 22 and 24 and specifically is a movement $x(t)$ and $y(t)$ which represent a movement of the head member corresponding to the original digital data $X(t)$ $Y(t)$.

The use of the sine-cosine function to control the linear motor portion of the head members provides for a continuous analog control rather than a stepping control. In this way, the translating field vector may be made to lead or lag the position vector of the plate member by an electrical angle which may be a direct function of the acceleration or deceleration required to provide for the desired movement of the head member. It is thereby possible to increase or decrease the number of pulses supplied to the digital analog converters 14 and 16 to control the acceleration and deceleration of the head member.

It is to be appreciated that the digital data may be fed directly to the head member to provide for the acceleration and deceleration or that the continuous control using the sine-cosine functions for an input to the head member may be provided without the acceleration and deceleration. However, the combination of the digital analog converter to provide for a continuous control with acceleration and deceleration control bursts produces a smooth rapid movement of the head member to provide for an increase in the speed of operation of the head member relative to prior art devices. A clearer understanding of the acceleration and deceleration control bursts may be seen with reference to FIGS. 2a and 2b.

Figure 2A:
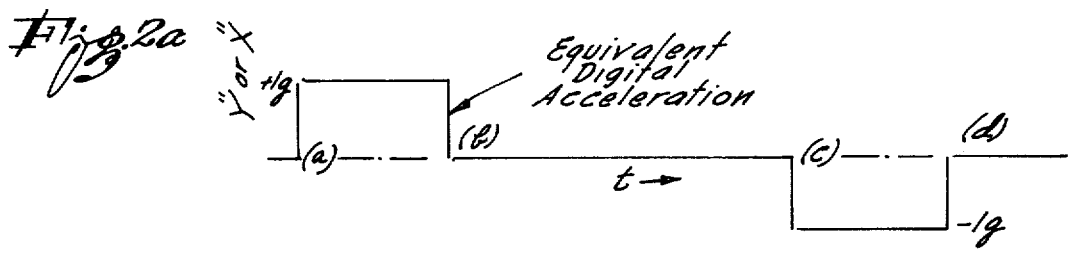
FIG. 2a illustrates the provision of the control bursts to control the acceleration and deceleration of the head member and FIG. 2b illustrates the effect of the control bursts on the accelerations of the head member.
Figure 2B:
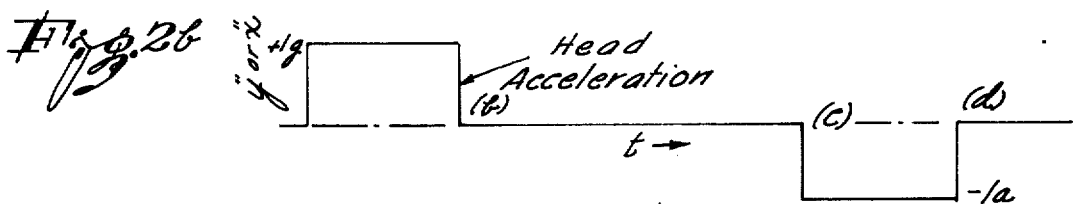

In FIG. 2a, a drawing representing the equivalent digital acceleration is shown, and FIG. 2b illustrates the resultant head acceleration. Specifically, in FIG. 2a and at point (a) a control burst of acceleration is provided to produce a continuous acceleration of the head member, for example, an acceleration such as +1G until the head member reaches a desired terminal velocity represented at point (b). At point (b) a negative acceleration control burst is applied which is equal to but opposite in direction to the control burst of acceleration at point (a). A net head acceleration of zero is therefore provided after the control burst at point (b). The translating field vector may now be commended to rotate at a constant rate in the direction desired so as to produce a movement of the head member at the desired terminal velocity.

At a point (c) it becomes desirable to provide for a deceleration of the head member so as to provide maximum average deceleration over the time interval and to prevent an overshoot which might result in oscillation or hunting of the head member. The deceleration is provided by a negative control burst at point (c) to produce a deceleration. When the head velocity component reaches zero, which occurs at point (d), a positive control burst is provided equal to but opposite from the control burst provided at point (c) so as to produce a net acceleration of zero to thereby provide for a stopping of any movement of the head member.

As indicated above, the digital commands which are used to advance or retard the electrical angle of the translating field vector are called "control bursts." The amplitude of the control bursts at points (a), (b), (c) and (d) may be equal but with opposite polarities for points (a) and (d) as compared with points (b) and (c), but the amplitudes of the control bursts may have varying amplitudes. It is also to be noted that the distance between points (a) and (b) would usually be equal to the distance between points (c) and (d), but this may be varied if desired. It is to be appreciated, for example, that the control bursts could in general be made proportional to instantaneous acceleration with a computer updating as a function of time by adding to or subtracting from the required burst increments.

The resultant head acceleration from the use of the control bursts is shown in FIG. 2b. Specifically in FIG. 2b, the head member is shown to have an acceleration such as an acceleration of 1G between the points (a) and (b), a zero acceleration between the points (b) and (c) and a negative acceleration between the points (c) and (d).

Figure 3A:
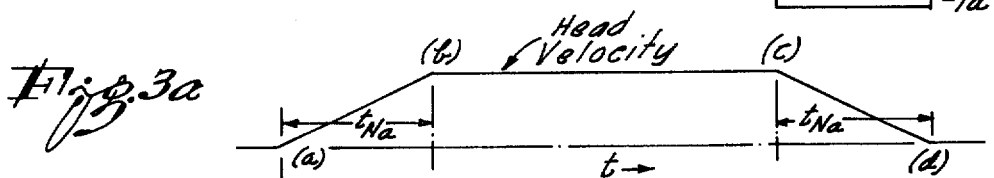
FIGS. 3a through 3d illustrate the desired velocity profile for digital data representing various distances of movement of the magnetic head member.

FIGS. 3a through 3d illustrate the velocity profile for the head member. Specifically, FIG. 3a shows the velocity profile for the head member when controlled to have the acceleration as shown in FIG. 2b. As can be seen in FIG. 3a, the velocity profile also includes the points (a), (b), (c) and (d) which relate to the same points (a), (b), (c) and (d) in FIGS. 2a and 2b. In FIG. 3a the head member has an increasing velocity between points (a) and (b) due to the constant acceleration as explained above with reference to FIGS. 2a and 2b. Between points (b) and (c) the velocity is constant due to the zero acceleration, and between points (c) and (d) the velocity diminishes due to the deceleration provided to the head member, again as explained above with reference to FIGS. 2a and 2b.

FIG. 3a represents, therefore, the desired velocity profile for the movement of the head member greater than a predetermined minimum distance represented by $2N_a$. Specifically, the distance $N_a$ represents the distance required to reach the desired terminal velocity for a given value of acceleration.

Figure 3B:
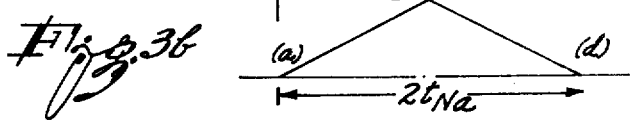
Figure 3C:
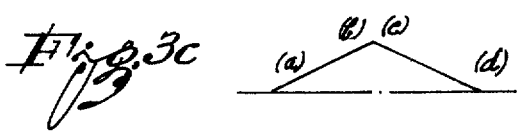

FIG. 3b represents the velocity profile when the head member is to move a distance less than $2N_a$. It can be seen in FIG. 3c that it is desirable to provide for acceleration and deceleration with the provision of control bursts at points (a), (b), (c) and (d) in the same manner as explained above with reference to FIG. 2a, but wherein the head member never reaches its desired terminal velocity. It is, therefore, necessary to provide for a first override control when the head member is to move a distance less than $2N_a$.

Figure 3D:
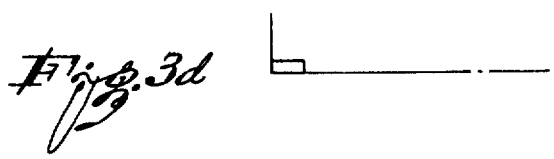

Finally, FIG. 3d shows the velocity profile when the head member is to move a very short distance and where there is not sufficient time to provide for maximum acceleration and deceleration. In this instance, the head member is moved at a constant velocity at a constant pulse rate usually much lower than if full acceleration has been provided as explained above until the head member has been moved to the desired point.

Figure 5:
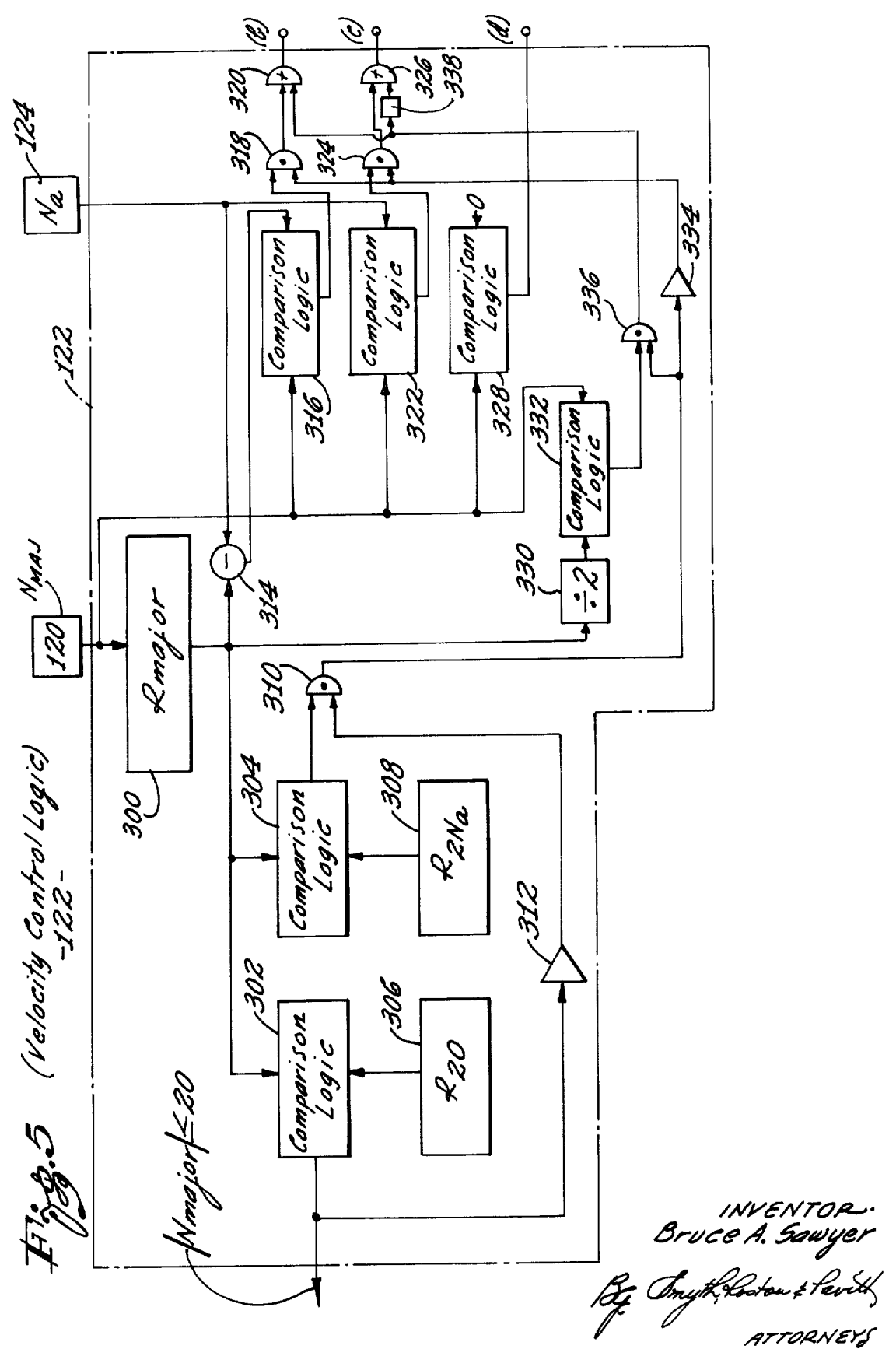

The points (a), (b), (c) and (d) referred to in FIGS. 2a and 2b and FIGS. 3a through 3c are also used with reference to FIGS. 4 and 5 and a clearer understanding of the invention will be had with reference to the schematic representation of the control system shown in FIGS. 4 and 5.

As shown in FIG. 4, input information $N_x$ and $N_y$ representing a shift in data is applied to a data buffer 100. The data buffer 100 may be a magnetic core, tape, etc., and the shift in data as represented by $N_x$ and $N_y$ is digital information in representation of the number of increments of movement along the X and Y axis of the plate member. A clock signal is also applied to the data buffer 100 to control the output rate of the information from the data buffer.

The output from the data buffer is applied to registers 102 and 104. The register 102 receives the information representing the digital data $N_x$ and the register 104 receives the information representing the digital data $N_y$. In addition, the registers 102 and 104 include reset inputs which provide for a reset of the registers after the information has been used to provide for the movement of the head member the desired distance and direction. The information fed into the registers 102 and 104 is treated as absolute quantities but the sign or polarity of the information is taken as an output signal from a portion of the register designated "sign" in both the registers 102 and 104. The output signal representing the sign is used to control switch members 106 and 108. The switch members 106 and 108 provide for a forward or backward movement of the head member in accordance with the position of the switches.

The output signal from the registers 102 and 104 representative of the digital data $N_X$ and $N_Y$ is applied to comparison logic 110 to determine which of the digital data is greater in value. The output signal from the comparison logic is then used to control switches 112 and 114. Also, the outputs from the registers 102 and 104 are applied to a divider 116, which divider provides an output signal having a numerical value equal to or less than one and which signal is designated as K. The signal K represents (N minor/N major).

Normally, the divider 116 is set to provide for the output signal K wherein X is the major axis and Y is the minor axis. However, when the digital data $N_Y$ is greater than the digital data $N_X$, the Y is to be the major axis and X is to be the minor axis. At that time, the output signal from the comparison logic 110 controls the divider 116 so as to switch the input signals to the divider 116 and so that the output signal K has a value less than one.

The outputs from the registers 102 and 104 are also applied to the switch 112 and, as indicated above, the comparison logic 110 controls the position of the switch 112 to pass either the information from the register 102 or 104 and specifically to pass the information from the register which contains the information having a higher value and which is therefore considered to represent the major axis.

The output from the switch 112 is also applied through a gate 118 to a countdown register 120. The information representative of the major axis is therefore applied to the countdown register 120 and is counted down in response to a countdown clock signal, the formation of which will be described at a later portion of this description. The input to the countdown register 120 is a digital number greater than zero which is then counted down to zero in response to the countdown clock signal.

The output from the countdown register 120 is applied to the velocity control logic 122. In addition to the output from the countdown register 120, the velocity control logic 122 receives as an additional input a signal designaed $N_a$ from a register 124. A variable control 126 may be used to set the register 124 to a desired value of $N_a$. As described with reference to FIG. 3a, $N_a$ is a number representing the distance or number of counts required for the head member to accelerate to the desired terminal velocity and also to decelerate from the desired terminal velocity to zero. The control of the value of $N_a$ is provided because variables such as the type of input information, type of output device, quality of the media, etc., may result in different optimum values for accelerations and velocity under different conditions.

The outputs from the velocity control logic are a series of signals designated (b), (c), (d) which represent those points (b), (c) and (d) shown in FIGS. 2a and 2b and FIGS. 3a through 3c. In addition, the velocity control logic 122 provides an output designated as $N_{major} \leq 20$ which represents an override control for short movements of the head number. The number 20 represents 20 incremental movements of the head member and is chosen to be illustrative only. It is to be appreciated that a value greater or less than 20 may be chosen. The increments refer to arbitrary fractions of an inch such as arbitrary divisions of the distance between successive ones of magnetic portions of the head member and plate member as described with reference to U.S. Pat. No. 3,457,482. In a typical system as described herein the increments are 1/40 of the pitch, but is is to be appreciated that the increments may be coarser or finer depending upon the specific requirements of the system.

The output signal from the velocity control logic 122 represented as (b) is applied as an input signal to an OR gate 128, to a second OR gate 130 and as a HOLD signal for a ramp generator 132. The output signal (c) from the velocity control logic 122 is applied as an input signal to the OR gate 128 and the OR gate 130, and as a DOWN signal to the ramp generator 132.

The output signal (d) from the velocity control logic 122 is provided as an input signal to an OR gate 134 and as a reset signal to the registers 102 and 104. In addition, the signal (d) from the velocity control logic 122 is provided as a reset signal for a flip-flop 136 and a stop signal for a fixed frequency pulse generator 138.

A START signal from terminal 139 is provided to the OR gates 130 and 134 and to the ramp genrator 132. The start signal from terminal 139 is applied to a first AND gate 140 and a second AND gate 142. The override signal ($N_{major} \leq 20$) from the velocity control logic 122 is applied as an input to the AND gate 140 and also as an input to the AND gate 142 through an inverter 144.

Normally when a start signal is received at terminal 139 from an external source of information, this start signal provides for the ramp generator 132 to initiate operation. The slope of the ramp generator is controlled by a set control 146. The output from the ramp generator is applied to control a variable pulse frequency generator 148 so as to produce a pulse rate in accordance with the amplitude of the output from the ramp generator. Coordination between the control 146 and the control 126 should be provided so that the ramp generator 132 has the proper slope to provide for the desired acceleration and the value held in register 124 provides the desired terminal velocity. The output from the variable pulse frequency generator 148 passes through a gate 150 which is controlled by the flip-flop 136.

It can be seen that when the start signal is received at terminal 139, the flip-flop 136 is set so as to allow the output from the variable pulse frequency generator 148 to be passed through the gate 150. The flip-flop 136 will be reset in response to the signal (d) from the velocity control logic 122. If an override signal ($N_{major} \leq 20$) from the velocity control logic 122 is present, the AND gate 142 is inhibited and will not pass the start signal. However, if the override signal ($N_{major} \leq 20$) is not present from the velocity control logic 122, the absence of such a signal because of the inverter 144 allows the AND gate 142 to pass the start signal.

The combination of the ramp generator 132 and the variable frequency pulse generator 148 provides for a controllable clock and provides for a pulse signal having a variable pulse rate. This controllable clock signal is passed through an OR gate 152 except when the override signal ($N_{major} \leq 20$) prevents the flip-flop 136 from being set.

The controllable clock signal from the pulse generator 148 may be divided by a divider 154 so that the pulse generator may produce the pulses at a relatively high rate and with greater accuracy than if the pulse generator produced the pulses at a lower rate. The controllable clock signal is also passed through a multiplier 156, which multiplier provides for a multiplication of the controllable clock signal by the constant K which, as described above, is the output signal from the divider 116. The constant K represents the value of ($N_{minor}/N_{major}$) and is always equal to or less than 1. Therefore, the clock signal from the output of the multiplier 156 usually has a pulse rate less than the pulse rate of the clock signal from the OR gate 152. The clock signal from the multiplier 154 is also applied to a divider 158 which divides the clock signal by the same value as the divider 154 so as to increase the accuracy of the clock signal as described above.

The clock signal from the divider 154 is applied as the countdown clock to the countdown register 120 so that the countdown register 120 is counted down at the same rate that the clock signal is used to provide for the control of the movement of the head member.

The override signal ($N_{major} \leq 20$) from the velocity control logic 122 is used to control a fixed frequency pulse generator in the following manner. The override signal from the velocity control logic 122 is applied as an input to the AND gate 140. In addition, the start signal from terminal 139 is applied as a second input to the AND gate 140. When both the start signal and the override signal are present, the ANd gate 140 passes a signal to control the starting of the fixed frequency pulse generator 138. In addition, as described above, the override signal controls the flip-flop 136 so that the gate 150 does not pass any output signals from the variable frequency pulse generator 148. Therefore, the output from the fixed frequency pulse generator 138 is passed by the OR gate 152 to provide for the clock signal which is used to control the movement of the head member for short distances.

The acceleration and deceleration control bursts are provided through the use of a register 160 containing a number designated $N_B$. The register $N_B$ has a set control 162 so as to adjust the value of $N_B$. The register 160 may hold a number up to a maximum value such as 10 which maximum value may represent a phase angle of 90° leading or lagging for the translating field vector relative to the position vector of the plate member. Each unit number between 0 and 10, therefore, may represent a phase angle of 9° for the translating field vector. It is to be appreciated that the register may hold a maximum number greater than 10 to provide for a finer control of the phase angle of the translating field vector.

The number $N_B$ is equal to the number of burst counts which are to be provided so as to determine the phase angle of the translating field vector either leading or lagging relative to the position vector of the plate member. This number should be coordinated with the desired acceleration so that the force provided produces the actual acceleration in a relatively short period of time compared to the plotting process of the head member. Ideally, the value of the acceleration should be provided for instantaneously.

The output from the register 160 is coupled to comparison logic 164. In addition, the output from a counter 166 is also applied to the comparison logic 164. A high-frequency clock signal is applied to a gate 168 and the output from the gate 168 controls the operation of the counter 166. The output of the gate 168 may be inhibited by the output from a flip-flop 170 which output is present in response to the comparison logic 164 providing for identity between the value of the signals produced by the counter 166 and the register 160.

The flip-flop 170 is set in response to one of four input signals passing through the OR gate 130. First, the start signal fom the terminal 139 produces a set signal for the flip-flop 170 which allows the high-frequency clock signal to be passed by the gate 168 to the counter 166 which in turn provides for a count in the counter 166. The counter counts out the number of pulses representing the number contained in the register 160 until the comparison logic 164 provides a reset signal to the flip-flop 170.

The output from the counter 166 is applied to the gate 172, gate 174 and multiplier 176. The output from the multiplier 176 is to a pair of gates 178 and 180. The multiplier 176 multiplies the burst count by the number representing K, which has been described above, so that the acceleration and deceleration of the head member along the major and minor axes are in the proper relationship. Gates 172, 174, 178 and 180 are controlled in response to the signals from the OR gates 128 and 134. For example, the start signal from the terminal 139 is applied to the OR gate 134 to control the gates 174 and 178 to pass the control burst, which control burst is added to the signals from the dividers 154 and 158 by the summers 182 and 184.

In this way, when the start signal is received from the terminal 139, the controllable clock signal is produced as the output from the dividers 154 and 158 and wherein additional bursts of pulses are summed with the clock signals from the dividers 154 and 158 to produce an acceleration burst in the proper relationship for the major and minor axes of control of the head member.

The second input to the OR gate 130 is from the signal (b) of the velocity control logic 122. The flip-flop 170 is then reset to once again allow the counter 166 to count down a number equal to the number in the register 160 to provide for a second control burst. At this time, the OR gate 128 controls the gates 172 and 180 to pass the control burst directly to the switch 114 to provide for the appropriate deceleration as shown at point (b) in FIG. 2a. A third input to the OR gate 130 is provided by the signal (c) from the velocity control logic 122 which again sets the flip-flop 170 to allow the counter 166 to once more count out the number held in the register 160. The signal (c) of the velocity control logic 122 controls the OR gate 128 in a similar manner as described above with reference to signal (b) to provide for an additional deceleration burst to the switch 114 as shown at position (c) in FIG. 2a.

A final input to the OR gate 130 is provided by signal (d) of the velocity control logic 122 which again sets the flip-flop 170 so that the counter 166 counts to the number held in the register 160 to provide for a control burst. At this time, the OR gate 134 controls the gates 174 and 178 to provide for the acceleration burst as shown at point (d) in FIG. 2a.

The register 160 and the counter 166 may be inhibited so that no control bursts are produced when the override signal ($N_{major} \leq 20$) appears from the velocity control logic 122. At that time, the override signal as inverted by an inverter 186 inhibits the AND gate 188 which is interposed between the OR gate 130 and the flip-flop 170. When the override signal is not present, the inverter 186 provides for a signal at the AND gate 188 which allows for the passage of all signals from the OR gate 130.

The switch 114 provides for the proper polarity of the signals coupled to the switches 106 and 108 so that the signals may either provide for acceleration or deceleration. The switches 106 and 108 may be controlled in accordance with the sign of the original input information so that the direction of movement of the head member may be properly controlled.

The output from the switches 106 and 108 is to a pair of registers 190 and 192 which count in both directions so that both a forward and a backward movement of the head member may be accomplished. Also note that once the switches 106 and 108 have been controlled to provide for the proper direction of movement of the head members in accordance with the sign of the input data, the acceleration and deceleration is controlled by the direction of the signals applied through the switch 114 and the switches 106 and 108 to the registers 190 and 192. The outputs from the registers 190 and 192 in turn provide digital control signals to the digital analog converters 14 and 16 illustrated in FIG. 1 and also included in FIG. 4. As explained above with reference to FIG. 1, the digital analog converters provide for a conversion from the digital signals to sine-cosine analog signals which when applied to the head member produce a resultant translating field vector. The translating field vector should lead or lag the position vector of the plate member by an electrical angle which is a direction function of the acceleration or deceleration required. The control system of the present invention provides substantially instantaneous control bursts so that the acceleration and deceleration may follow a pattern as shown in FIG. 2b. Generally, the control system chooses one of the axes to be major, as determined by which of the components $N_x$ and $H_y$ has the greater value. The translating field vector of that particular axis is then displaced a particular electrical angle as determined by the quantity fed into the register 160. The translating field vector of the other shorter minor axis is scaled by the ratio of N the shorter component ($N_x$ or $N_y$) divided by the longer component. The ultimate result is real accelerations and decelerations acting on the head member with the component values along each axis in the proper ratio so as to direct the displacement of the head in the desired direction.

As described above, the digital analog converters 14 and 16 provide for sine-cosine functions. The digital analog converters 14 and 16 may include in a conventional manner transistor switching in response to the digital input with resistors having values to provide sine-cosine output signals. It is to be appreciated that the digital analog converters may only include the switching and resistors for a single quadrant with appropriate logic switching so that the single quadrant provides the full desired periodic range for the sine-cosine functions. The outputs from the digital analog converters 14 and 16 are applied to a plurality of driver amplifiers 194 through 200 which in turn provide the appropriate output signals $i_{ax}$, $i_{bx}$, $i_{ay}$ and $i_{by}$ to coils 202 through 208. The coils are included in the head member to provide the driving force for the head member which may be of the type shown in U.S. Pat. No. 3,457,482. The head member shown in Pat. No. 3,457,482 is a linear, two-axis, two-phase, synchronous motor-type head.

FIG. 5 illustrates in greater detail the velocity control logic 122 shown in FIG. 4. Specifically, in FIG. 5 the inputs are shown to be that from the countdown register 120 and the register 124 representing the number of counts necessary to reach the desired terminal velocity. The output signals of the velocity control logic are shown to be (b), (c) and (d) illustrated in FIG. 4 and also the override signal which is shown as $N_{major} \leq 20$.

The output from the countdown register 120 is applied to a register 300 which holds the highest value of $N_{major}$. The output from the register 300 is applied to a pair of comparison logic circuits 302 and 304. In addition, the comparison logic circuits 302 and 304 receive inputs from registers 306 and 308. The register 308 contains a fixed numerical quantity such as the quantity 20 which relates to movement of the head member of a very short distance. The register 308 contains a numerical quantity representing the value $2 N_a$ which has been described with reference to FIGS. 3a and 3b.

The comparison logic 302 produces an output of signal which is the override signal ($N_{major} \leq 20$) when the numerical quantity held in the register 306 is greater or equal to the numerical quantity held in the register 300. The comparision logic 304 produces an output when the numerical quantity held in the register 308 is greater or equal to the numerical quantity held in the register 300. The output from the comparison logic 304 is coupled to an AND gate 310 and, in addition, the output from the comparison logic 302 is coupled to the AND gate 310 through an inverter 312. The AND gate 310 is, therefore, inhibited if there is an output from the comparison logic 302.

The output from the register 300 is applied to a subtractor 314. The subtracter 314 also receives the output from the register 124. Therefore, the subtractor 314 produces an output signal representing the difference between the maximum value of $N_{major}$ held in register 300 and the value of $N_a$ held in register 124. The output from the subtracter represents, the point (b) as shown in FIG. 3a.

The output from the subtracter 314 is applied to comparision logic 316 which also receives the output from the countdown register 120. The comparison logic 316 produces an output signal when the value of the countdown register has been counted down to the value of the signal produced from the subtracter 314. The output from the comparison logic 316 is applied through an AND gate 318 and an OR gate 320 to be the output signal (b). It can be seen that the point (b) shown in FIG. 3a and also described with reference to the signal (b) of FIG. 4 occurs when the register 120 has its value counted down to the value as represented by the output from the subtracter 314.

The output from the register 120 is also applied as a first input to comparison logic 322. The second input to the comparison logic 322 is from the register 124. The comparison logic 322, therefore, produces an output signal when the countdown register 120 has been counted down to the value $N_a$ and this output signal from the comparison logic 322 is supplied through an AND gate 324 and an OR gate 326 as the output signal (c).

The output from the countdown register 120 is also applied as an input to the comparision logic 328 which receives as its second input a value of zero. Therefore, when the countdown register 120 reaches the value of zero, the comparison logic 328 produces the output signal (d).

In order to provide for an override control when the highest value of the countdown register 120 held in the register 300 is equal to or less than $2N_a$, a subsidiary circuit is provided. The subsidiary circuit includes a divider 330 which divides the numerical value of the signal held in the register 300 in half and comparison logic 332 which receives the output from the divider 330 and also the output from the countdown register 120. Therefore, the comparision logic 332 produces an output signal when the value of the countdown register 120 has reached its halfway point.

The output signal from the comparison logic 332 is applied as a first input to an AND gate 336. The AND gate also receives as a second input the output from the AND gate 310, which output only occurs when the comparison logic 304 determines that the output from the register 300 is equal to or less than $2N_a$. The output from the AND gate 310 is also passed through an inverter 334 and applied to the AND gates 318 and 324 to inhibit an output from the comparison logic 316 and 322 when the value held in the register 300 is equal to or less than 21 $N_a$.

The output from the AND gate 336 which occurs at the halfway point for the highest value of $N_{major}$ is applied as an input to the OR gates 320 and 326. In order to insure that both signals (b) and (c) provide for the production of control bursts, a delay line 338 providing a short delay is included so that the signals (b) and (c) are not produced simultaneously.

The general operation of the control system of the present invention, therefore, is as follows: The initial inpu data is shifted from the data buffer 100 in response to the clock signal into the registers 102 and 104. A logic operation is performed by the comparison logic 110 to determine which register holds the major axis and which register holds the minor axis. An arithmetic operation is performed by the divider 116 to produce the constant K representing the value of ($N_{minor}/N_{major}$). In addition, the relay 112 as controlled by the comparison logic 110 determines the proper input for the countdown register 120.

The value of $N_{major}$ is then set into the register 120. At this time, the data input produces a start plot command at terminal 139 to initiate the plotting by the head member. The flip-flop 170 opens the gate 168 and the counter 166 counts to the number held in the register 160 which represents the acceleration control burst. The output from the comparision logic 164 produces a reset to reset the flip-flop 170 and also reset the counter 166. Meanwhile, the pulses that were counted out of the counter 166 are fed through the gate 174 to be summed into the major axis pulse channel by summer 182. The minor axis acceleration control burst is fed through gate 178 after having beem modified by the constant K by multiplier 176.

In addition to the above operation, when the start pulse occurs at terminal 139, flip-flop 136 opens gate 150 and ramp generator 132 linearly with time increases the variable frequency generator 148 from zero pulses per second to an increased pulse rate to produce the major axis pulse rate. The multiplier 156 scales that pulse rate in accordance with the factor K to give the minor axis pulse rate. The major and minor axes pulse command signals are switched by switching system 114 to the proper digital analog converters.

The countdown register 120 is counted down by the major axis pulses produced from the variable frequency generator 148. The velocity control logic 122 determines the points (b), (c) and (d) as described with reference to FIG. 5. Signal (b) causes the ramp generator 132 to hold the variable frequency pulse generator at a constant rate and, in addition, the signal (b) controls the gate 128 which in turn controls gates 180 and 172 to be open. The output signal (b) also sets the flip-flop 170 causing the value $N_b$ held in the register 160 to be counted out by the counter 166 through the comparison logic 164. The output from the counter 166 is passed through the gates 172 and 180 and through the switching circuit 114 to control the digital analog converter in a reverse direction from the initial control burst.

The velocity control logic 122 which is described with reference to FIG. 5 produces the signals (b), (c) and (d) in the following manner: When the countdown register 120 is counted down to a value of $N_{major} - N_a$, signal (b) is produced. When the value in the countdown register 120 has a value of $N_a$, the signal (c) is produced, and when the countdown register 120 is counted down to zero, the signal (d) is produced.

The above sequence of signals occurs when $N_{major}$ is greater than $2N_a$. When $N_{major}$ is less than or equal to $2N_a$, the signal (c) follows the signal (b) in a short time period as determined by the time delay 338 shown in FIG. 5. When $N_{major}$ is less than or equal to a very small fixed value such as 20 increments, the override control ($N_{major} \leq 20$) from the comparison logic 302 shown in FIG. 5 controls the fixed frequency pulse generator 138 to produce the clock signal and the flip-flop 170 is inhibited from operating by the inverter 186 and the AND gate 188.

The digital control signals including the acceleration and deceleration bursts are converted by the digital analog converters into sine and cosine signals which are recurrent signals for each axis wherein each axis is related by the factor K so that the direction of movement of the head member is proper. The sine-cosine outputs when applied to the head members produce a translating field vector which is positioned to lead or lag the vector of the plate member by an electrical angle which is a direct function of the acceleration and deceleration required.

Figure 6:
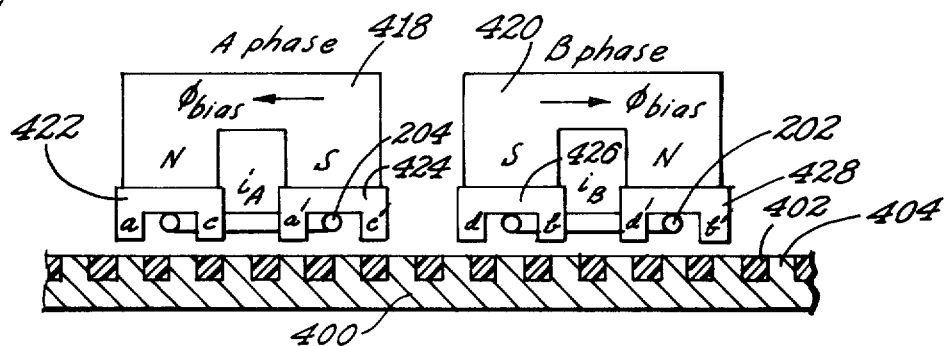
FIG. 6 illustrates a portion of the head member and the plate member.
Figure 7:
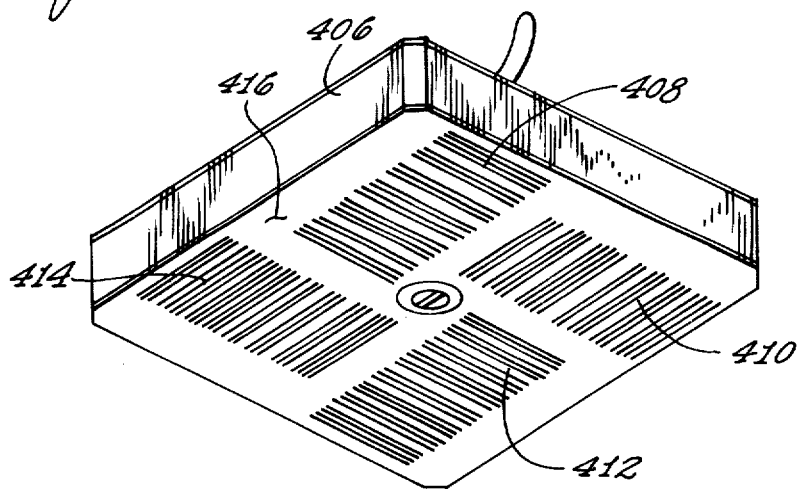
FIG. 7 illustrates a head member including four sets of magnets.

The description of the present invention has been shown to apply to a control system for use with a head member of the type shown in U.S. Pat. No. 3,457,482, and FIGS. 6 and 7 illustrate the head member and plate member of that patent in greater detail. In FIG. 6 the plate member 400 may be formed of a set of ferromagnetic material such as iron having a plurality of parallel grooves 402 formed therein with one set of grooves normal to the X axis and another set of grooves normal to the Y axis. Therefore, magnetic teeth 404 project upwardly between the grooves. Normally, the grooves are at right angles to each other and are equally spaced so that the magnetic teeth have a square cross section.

A head member 406 as shown in FIG. 7 includes four sets of magnets 408, 410, 412, and 414, which sets of magnets are mounted in a housing 416 with the pole faces of the sets of magnets at the surface of the housing. Typically, the housing 416 is a non-magnetic plate having apertures for receiving the sets of magnets.

The sets of magnets 408 and 412 are disposed parallel to, for example, the X axis and are used to propel and position the head member along the X axis and similarly the sets of magnets 410 and 414 are disposed parallel to the Y axis and are used to propel and position the head member along the Y axis. The displacement of the head member along one of the axes using a first set of magnets is independent of the displacement of the head member along the other of the axes using the second set of magnets.

The construction of each one of the sets of magnets 408 through 414 is similar and FIG. 6 illustrates one set and will be described in detail. Each set comprises two magnets 418 and 420 and each magnet has two pole pieces. For example, the magnet 418 includes pole pieces 422 and 424 and the magnet 420 includes the pole pieces 426 and 428. Each of the magnets 418 and 420 includes a coil intercoupled between the pole pieces. Specifically, magnet 418 may include the coil 204 referred to with reference to FIg. 4 and the magnet 420 may include a coil 202 referred to with reference to FIG. 4.

Each of the pole pieces of each of the magnets includes two pole faces shown in FIG. 6 as $a$ and $c$ for pole piece 422; $a'$ and $c'$ for pole piece 424; $d$ and $b$ for pole piece 426, and $d'$ and $b'$ for pole piece 428. Each pole face may comprise a single ridge as shown in FIG. 6, but it is to be appreciated that each pole face may comprise a plurality of spaced ridges.

The pole faces $a$ and $c$ are spaced such that when one is over a magnetic tooth 404 of the plate member 400, the other is over the non-magnetic material. All of the sets of pole faces are spaced in the same manner. The two pole pieces 422 and 424 are spaced so that pole faces $a$ and $a'$ are over magnetic teeth at the same time.

The magnet 418 is constructed in the same manner as the magnet 420 and the two magnets are spaced so that when the pole faces of one magnet are directly over a tooth or a space between the teeth, the pole faces of the other magnet are midway between the tooth and the space between the teeth.

As shown in FIG. 7, the two parallel sets of magnets, for example, the magnets 408 and 412, are arranged to have the $a$ and $b$ phase magnets in opposite relationship so as to provide for an improved balancing of forces to prevent the rotation of the head 406 during operation. The parallel sets of magnets 410 and 414 are arranged in the same manner.

The sine and cosine signals provided from the digital analog converters 14 and 16 shown in FIG. 4 are applied to the coils 204 and 202 to produce a translating field vector relative to the position vector of the plate member provided by the magnetic teeth 404. The translating field vector may be made to lead or lag the position vector so as to produce acceleration or deceleration movement of the head member in a particular direction along an axis as explained with reference to FIG. 4.

The use of the sine-cosine functions to provide for a continuous analog signal to provide for the magnetic interaction between the magnets and the teeth of the plate member produces a finer control of the relative movement of the head member to the plate member in comparison to the stepping control discussed with reference to Pat. No. 3,457,482. The use of the fully programmed acceleration and deceleration control as explained above provides for a considerable increase in the speed of operation of the magnetic device of the present invention when compared with prior art devices.

The relative position between the head member 406 and the plate member 400 is in accordance with the input data to the head member and specifically is in accordance with the change in the position of the head member relative to the previous position. It is to be appreciated that the absolute position of the head member relative to the plate member may, therefore, be determined in accordance with a consideration of the total input data to the head member. In a converse manner, the movement of the head member may be used to provide for an output indication of the change in the position of the head member. The positioning device, therefore may be used to provide for an output indication in the form of digital signals.

Although the description and drawings have been shown to apply to a control system for use with a head member of the type shown in U.S. Pat. No. 3,457,482, it is to be appreciated that the control system may be used with other types of positioning devices. For example, the control system may be used to provide positioning in other than planar types of systems. For example, the positioning device may be moved on a polar, spherical, circumferential, etc., type of surface. Also, the control system of the present invention may be used to provide control for types of positioning devices other than that shown in U.S. Pat. No. 3,457,482. The invention is only to be limited by the appended claims.

I claim:

1. In a system for providing a controlled relative movement between two members along a particular axis, the combination of:

a first member, a second member disposed relative to the first member for displacement relative to the first member along the particular axis, first means for providing signals representing any desired displacements of the first member relative to the second member to any desired position along the particular axis, second means for providing signals having sinusoidal characteristics and having a particular phase displacement relative to each other, third means responsive to the signals from the first means and the signals from the second means for providing indications representing the positions at which the signals from the second means are to be shifted through a controllable angle, during the displacements of the first member relative to the second member along the particular axis, in accordance with the desired displacement represented by the first signals, fourth means responsive to the signals from the third means for instantaneously shifting the phase of the signals from the second means through the controllable and variable angles at the particular positions in accordance with the characteristics of the signals from the third means and for maintaining the phase shift of such signals through the controllable and variable angle for an extended distance after such particular positions to provide for controlled variations in the magnitudes of accelerations and decelerations between the first and second members along the particular axis in accordance with the shifts in the phase of the polyphase recurrent analog signals through the controllable angles, fifth means for varying the frequency of the signals from the second means, and sixth means operatively coupled to a particular one of the first and second members and interacting with the other one of the first and second members and disposed in phase-displaced relationship in accordance with the phase displacement of the signals from the second means and responsive to the phase-shifted signals provided by the fourth means for imposing controlled magnitudes of acceleration and deceleration between the first and second members along the particular axis to produce continuous displacements between the first and second members along the particular axis to the desired position, the first and second members being constructed to provide a movement of the second member relative to the first member in synchronism with the recurrent characteristics of the signals from the fourth means.

2. In the system set forth in claim 1, the first and second members being planar and being disposed in spaced relationship to each other, the other one of the first and second members having magnetic properties and the sixth means being provided with magnetic properties for cooperating with the other one of the first and second member to impose controlled variations in the magnitudes of acceleration and deceleration between the first and second members along the particular axis in accordance with the variations in the controllable shifts provided by the fourth means in the signals from the second means and the fourth means constituting means for energizing the sixth means and the fifth means being operative to vary the frequency of the phase-shifted signals provided by the fourth means at a rate to maintain the controllable and variable phase shifts by the fourth means in the signals from the second means throughout the period of the imposition of the acceleration and deceleration between the first and second members.

3. In a system providing controlled magnitudes of accelerations and decelerations between two members along a particular axis and a displacement between the two members through any desired distance along such particular axis to a particular position in accordance with input data, the combination of first means for producing first and second signals having a particular phase displacement relative to each other and having sinusoidal characteristics, second means for providing signal indications at each instant of the displacement to be provided between the first and second members along the particular axis to the particular position, third means responsive to the signals from the second means for providing signals representing desired accelerations and decelerations to be provided between the two members at particular positions in the displacement to be provided between the members, fourth means responsive to the signals from the third means to shift instantaneously the phase of the sinusoidal signals from the second means through controllable and variable angles at the particular positions and to maintain such phase shifts through extended distances beyond the particular positions to provide for variations in the magnitude of the accelerations and decelerations between the two members in accordance with such shifts in phase during the displacement between the two members through the desired distance to the particular position, and fifth means for varying the frequency of the phase-shifted signals from the fourth means to maintain the phase shifts in such signals through the extended distances beyond the particular position, and sixth means operatively coupled to a particular one of the first and second members and responsive to the phase-shifted signals from the fourth means for producing instantaneous variations in the magnitude of the accelerations and decelerations between the first and second members at the particular positions along the particular axis and for maintaining such accelerations and decelerations through the extended distances beyond such particular positions to produce continuous displacements between the first and second members to the particular position, the first and second members being constructed to provide a displacement between the first and second members in synchronism with the phase-shifted sinusoidal signals from the fourth means.

4. The system of claim 3 wherein the fourth means includes sixth means for controlling the instantaneous phase shifts of the sinusoidal signals from the second means at a first one of the particular positions to provide for a continuous and constant acceleration of the relative displacement between the two members through an extended distance from the first one of the particular positions until a particular terminal velocity and includes seventh means for thereafter controlling the instantaneous phase shifts of the sinusoidal signals from the second means at a second one of the particular positions to provide a displacement between the two members at the particular terminal velocity and includes eighth means for thereafter controlling the instantaneous phase shifts of the sinusoidal signals from the second means at a third one of the particular positions to provide for a continuous and constant deceleration of the relative displacement between the two members through an extended distance from the third one of the particular positions to the desired position of displacement between the two members and includes ninth means for thereafter controlling the phase shifts of the sinusoidal signals from the second means at the particular position to step such displacement and wherein one of the members constitutes a platen and the other member constitutes a head contiguous to the platen and displaceable relative to the platen along the particular axis.

5. The system of claim 4 wherein the fifth means increase the frequency of the phase-shifted sinusoidal signals from the fourth means from the first particular position to the second particular position at a rate dependent upon the shift in the phase in such signals and decrease the frequency of the phase-shifted sinusoidal signals from the fourth means from the third particular position to the particular position at a rate dependent upon the shift in phase of such signals and wherein the third means provide at the first particular position a plurality of signals of a first polarity and individually representing increments of a particular magnitude in the shift in phase in the polyphase recurrent signals and provide at the second particular position the plurality of signals of an opposite polarity and provide at the third particular position the plurality of signals of the opposite polarity and provide at the particular position the plurality of signals of the first polarity.

6. In a system for providing controlled magnitudes of acceleration and deceleration between first and second members along first and second coordinate axes in accordance with input data and a displacement between the two members for first and second particular distances respectively along the two axes to any particular position along the first and second axes in accordance with such input data, the combination of:
   first means responsive to the input data for producing first signals having characteristics representing a desired displacement between the two members through the first particular distance along the first coordinate axis to the particular position,
   second means operatively coupled to the first means for producing second signals having characteristics representing controlled magnitudes of acceleration and deceleration at first particular positions in the relative displacement of the two members along the first axis,
   third means for producing signals having a particular phase displacement relative to each other and having sinusoidal characteristics,
   fourth means operatively coupled to the third means and the second means for instantaneously shifting the phase of the sinusoidal signals from the second means, at the first particular positions along the first axis and extended distances along the first axis beyond the first particular positions, through a first controllable angle to provide for instantaneous variations in the controlled magnitudes of accelerations and decelerations between the first and second member along the first particular axis in accordance with such instantaneous shifts in phase,
   fifth means responsive to the input data for producing third signals having characteristics representing a desired displacement between the two members through the second particular distance along the second coordinage axis,
   sixth means for producing second signals having the particular phase displacement relative to each other and having sinusoidal characteristics,
   seventh means operatively coupled to the fifth means for producing fourth signals having characteristics representing controlled magnitudes of accelerations and decelerations at second particular positions in the relative displacements of the two members along the second axis,
   eighth means operatively coupled to the sixth and seventh means for instantaneously shifting the phase of the second sinusoidal signals from the sixth means, at the second particular positions along the second axis and extended distances along the second axis beyond the second particular positions, through a second controllable angle to provide for instantaneous variations in the controlled magnitudes of accelerations and decelerations between the first and second members along the second particular axis in accordance with such instantaneous shifts in phase,
   ninth means operatively coupled to the fourth means for instantaneously producing variations in the magnitudes of the accelerations and decelerations between the two members along the first coordinate axis in accordance with the instantaneous variations in the phase characteristics of the phase-shifted first sinusoidal signals from the fourth means to produce continuous displacements between the first and second members through the first particular distance along the first coordinate axis to the particular position,
   tenth means operatively coupled to the seventh means for instantaneously producing, simultaneous with the operation of the ninth means, variations in the magnitudes of the accelerations and decelerations between the two members along the second coordinate axis in accordance with the instantaneous variations in the phase characteristics of the phase-shifted second sinusoidal signals from the eighth means to produce continuous displacements between the first and second members through the second particular distance along the second particular axis to the particular position,
   the first and second members being constructed to provide displacements between the first and second members along the first and second coordinate axes in synchronism with the first and second sinusoidal signals,
   eleventh means for varying the frequency of the phase-shifted sinusoidal signals from the fourth means to maintain the shifts in phase of such signals through the first controllable angle at the first particular position and the extended distances beyond such first particular positions, and
   twelfth means for varying the frequency of the phase-shifted sinusoidal signals from the eighth means to maintain the shifts in phase of such signals through the second controllable angle at the second particular positions and the extended distances beyond such second particular positions.

7. The system of claim 6 wherein the fourth means provide for an acceleration in the relative displacement between the first and second members at a first one of the first particular positions and for an extended distance beyond such first one of such first particular positions until a desired terminal velocity along the first axis and thereafter provide for displacements between the first and second members at substantially the desired terminal velocity and thereafter provide for a deceleration in the relative displacement between the first and second members at a second one of the first particular positions and for an extended distance beyond such second one of the second particular positions to obtain the displacement between the first and second members through the particular distance along the first axis to the particular position and wherein thirteenth means are provided for determining the ratios of the distances represented by the signals from the first and fifth means and wherein the ninth means provide for an acceleration in the relative displacement between the first and second members along the second axis during the acceleration in the relative displacement between the first and second members along the first axis, with the ratio of such accelerations corresponding to the ratio determined by the thirteenth means, and thereafter provide for displacements between the first and second members at substantially constant speed along the second axis during the desired terminal velocity between the first and second members along the first axis, with the ratio of such velocities corresponding to the ratios determined by the thirteenth means, and thereafter provide for a deceleration between the first and second members along the second axis during the deceleration between the first and second members along the first axis, with the ratio of such decelerations corresponding to the ratio determined by the thirteenth means.

8. The system of claim 7 wherein the fourth means include means for producing digital bursts of signals, at the first and second ones of the first particular positions and at the position of reaching the desired terminal velocity and at the particular position, of a count dependent upon the acceleration or deceleration to be provided between the first and second members along the first particular axis and the ninth means includes means for producing digital bursts of signals at times corresponding to the digital bursts of signals produced by the fourth means and of a count having the same ratio with the digital burst of signals from the fourth means as the ratio determined by the thirteenth means.

9. In combination for providing a controlled movement of a first member relative to a second member along a particular axis,
first means for providing data in the form of signal information representing the desired displacement of the member through a particular distance along the particular axis to any desired position,
second means for driving the first member relative to the second member along the particular axis,
third means responsive to the signal information representing the desired displacement along the particular axis of the first member relative to the second member through the particular distance for providing signal indications controlling in sequence the first relative position along the particular axis and extended distances beyond such relative position of instantaneous acceleration at a particular magnitude of the first member to a particular speed, subsequently the second relative position along the particular axis of displacement of the member at the particular speed and subsequently the third relative position along the particular axis and extended distances beyond such relative position of instantaneous deceleration at the particular magnitude of the member to obtain the displacement of the member through the particular distance to the particular position,
fourth means responsive to the signal indications representing the control by the third means of the acceleration of the first member for providing, at the first relative position along the first particular axis, a first digital burst of signals in representation of the instantaneous acceleration to be provided between the first and second members,
fifth means responsive to the signal indications representing the control by the third means of the displacement of the member at the particular speed for providing, at the second relative position along the first particular axis, a second digital burst of signals of the same count as the first burst to obtain a continuous movement of the member at the particular speed,
sixth means responsive to the signal indications representing the control by the third means of the deceleration of the member for providing, at the third relative position along the particular axis, a third digital burst of signals of the same count as the first burst,
seventh means responsive to the signal indications representing displacement of the first member relative to the second member through the particular distance along the particular axis for providing, at the particular position along the particular axis, a fourth digital burst of signals of the same count as the first burst to obtain an interruption in the movement of the first member relative to the second member,
eighth means for providing sinusoidal signals having a particular phase displacement for introduction to the second means to drive the first member relative to the second member along the particular axis,
ninth means responsive to the first, second, third and fourth digital burst of signals for producing shifts in the phases of the sinusoidal signals from the eighth means and responsive to the count of such digital burst to obtain controlled acceleration, constant velocities and decelerations of the first member relative to the second member in accordance with such shifts in phase, and
tenth means for providing changes in the frequency of the phase-shifted sinusoidal signals from the ninth means to maintain such shifts in phase even with changes in the displacement between the first and second members.

10. In a system for providing a controlled displacement between two members to any desired position in accordance with input data, the combination of:
first means responsive to the input data for producing digital signals representing the relative displacements to be produced between the two members to the desired position between the members,
second means for providing first and second signals having sinusoidal characteristics and having a particular phase relationship to each other,
third means responsive to the signals produced by the first means for producing, at particular positions of extended range in the displacements between the two members to the desired position, signals representing instantaneous accelerations and decelerations of particular magnitudes to be instantaneously applied between the two members at the particular positions, fourth means operatively coupled to the second and third means to shift the phases of the first and second sinusoidal signals to produce, at the particular positions of extended range, and thereby produce third and fourth signals having sinusoidal characteristics and having the particular phase relationship and having a displaced phase relative to the first and second recurrent sinusoidal signals to provide for instantaneous changes in the magnitudes of the accelerations and decelerations between the two members, the two members being constructed and interrelated to provide for the relative movement between the two members in a continuous and synchronous relationship with the phase-shifted sinusoidal signals from the fourth means, and fifth means responsive to the third and fourth sinusoidal signals and operatively coupled to a particular one of the two members to produce instantaneous variations in the magnitudes of the accelerations and decelerations between the two members in synchronism with such sinusoidal signals to produce a continuous displacement between the first and second members to the desired position, and sixth means for varying the frequency of the third and fourth sinusoidal signals to maintain the displacements in phase of the third and fourth sinusoidal signals relative to the first and second sinusoidal signal during the periods of acceleration and deceleration between the two members.

11. In a system for providing a controlled displacement along first and second coordinate axes to any desired position in accordance with input data, the combination of, a first member, a second member movable relative to the first member along the first and second coordinate axes, first means responsive to the input data for producing first signals having characteristics representing the relative displacement desired between the two members through a first particular distance to the desired position along the first coordinate axis, second means responsive to the signals produced by the first means for producing, at particular positions of extended range along the desired displacement between the two members along the first coordinate axis to the desired position, signals having characteristics representing instantaneous changes in acceleration and deceleration between the first and second members at such particular positions, third means for producing first and second signals having sinusoidal characteristics and having a particular phase displacement relative to each other, fourth means operatively coupled to the first and second means for shifting, at the particular positions of extended range along the first coordinate axis, the phases of the first and second sinusoidal signals to provide for controlled changes in the magnitude of the acceleration and deceleration between the first and second members at the particular positions of extended range along the first particular axis, fifth means responsive to the input data for producing second signals having characteristics representing the relative displacement to the desired position through a second particular distance along the second coordinate axis simultaneously with the displacement between the two members through the first particular axis to the desired position where the second particular distance is less than the first particular distance, sixth means for producing third and fourth signals having sinusoidal characteristics and having the particular phase displacement relative to each other, seventh means responsive to the signals produced by the first and fifth means and to the signals produced by the second means for producing, at the particular positions of extended range along the second particular axis, signals having characteristics proportional to the characteristics of the signals produced by the second means in accordance with the ratio between the first and second particular distances, eighth means operatively coupled to the seventh means for shifting the phases of the third and fourth sinusoidal signals to provide for controlled changes in the magnitudes of the accelerations and decelerations between the first and second members along the second particular axis at the particular positions of extended range along the first particular axis, the first and second members being constructed to produce continuous displacements between the first and second members along the first and second axes respectively in synchronism with the phase-shifted first and second sinusoidal signals and with the phase-shifted third and fourth sinusoidal signals, ninth means operatively coupled to the fourth means for producing variations in the magnitudes of the acceleration and decelerations between the two members along the first coordinate axis in response to the shifts in the phase of the first and second sinusoidal signals, tenth means operatively coupled to the eighth means for simultaneously producing variations in the magnitudes of the accelerations and decelerations between the two members along the second coordinate axis in response to the shifts in the phase of the third and fourth sinusoidal signals, eleventh means for varying the frequency of the first and second phase-shifted sinusoidal signals at the particular positions of extended range along the first axis to maintain the shifts in the phase of the first and second sinusoidal signals at such positions, and twelfth means for varying the frequency of the third and fourth phase-shifted sinusoidal signals at the particular positions of extended range along the second axis to maintain the shifts in the phase of the third and fourth sinusoidal signals at such positions.

12. The combination set forth in claim 11, including eleventh means operatively coupled to the first and fifth means for comparing the characteristics of the signals produced by the first and fifth means to determine the relative displacements desired between the two members along the first and second coordinate axes, and twelfth means operatively coupled to the eleventh means for selecting the first axis as the major axis in accordance with the increased displacement desired between the two members along the first axis relative to the displacement desired between the two members along the second axis and for providing for the seventh means an operation slaved to the operation of the second means to provide at each instant for a phase displacement of the third and fourth sinusoidal signals proportionate to the phase displacement provided at that instant by the fourth means for the first and second signals having the sinusoidal characteristics.

13. In a system for providing a controlled relative displacement to any desired position along a particular axis, the combination of:

a first member, a second member movable relative to the first member along the particular axis and disposed in spaced relationship to the first member, first means for providing signals representing any desired displacement between the first and second members to the desired position along the particular axis, second means responsive to the signals provided by the first means for determining, prior to any relative movement between the first and second members to the desired position, the magnitudes and polarities of any accelerations to be provided between the first and second members along the particular axis to obtain the relative movement between the first and second members to the desired position and for determining the relative positions along the particular axis for obtaining such accelerations to obtain the displacement of the first member relative to the second member to the desired position, third means responsive to the magnitudes and polarities of the accelerations determined by the second means for providing, at particular positions in the displacement between the first and second members along the particular axis, signals having characteristics representative of the magnitudes and polarities of such accelerations, the signals being provided by the third means prior to any impositions of the accelerations between the first and second members, fourth means for providing first and second signals having sinusoidal characteristics and a particular phase displacement relative to each other, fifth means responsive to the signals from the third and fourth means for producing an instantaneous shift in the phase of the sinusoidal signals from the fourth means through particular angles at the particular positions, the first and second members being constructed to produce continuous relative displacements along the particular axis in synchronism with the sinusoidal characteristics of the signals from the fifth means, sixth means responsive to the phase-shifted sinusoidal signals from the fifth means for obtaining accelerations between the first and second members with magnitudes and polarities responsive to the phase shifts inparted to the first and second sinusoidal signals by the fifth means, and seventh means for varying the frequency of the phase-shifted first and second sinusoidal signals from the fifth means to maintain such phase shifts during the periods of acceleration and deceleration and to produce changes in speed between the first and second members along the particular axis in response to the accelerations and decelerations between the first and second member.

14. In a system for providing a controlled relative displacement simultaneously along the first and second coordinate axes to any desired position, the combination of:

a first member, a second member disposed in spaced relationship to the first member and movable relative to the first member simultaneously along the first and second axes, first and second means for providing first and second signals repectively having characteristics representing desired displacements simultaneously to be provided between the first and second members along the first and second axes, third and fourth means respectively responsive to the signals provided by the first and second means for determining, prior to any movement of the second member relative to the first member relative to the first member simultaneously along the first and second axes to the desired position, the magnitudes and polarities of accelerations simultaneously to be provided between the first and second members along the first and second coordinate axes and for determining the particular relative positions, during the desired displacements between the first and second members along the first and second axes, for obtaining such accelerations, fifth means for providing, at the particular relative positions in the displacements between the first and second members along the first and second particular axes, signals having characteristics representative of the magnitudes and polarities of such accelerations to be provided along the first coordinate axis, sixth means for providing, at the same particular relative positions in the displacements between the first and second members along the first and second coordinate axes as those at which the fifth means are operative, signals having characteristics representative of the magnitudes and polarities of such acclerations to be provided along the second coordinate axis, seventh means for providing first and second signals having particular phases displaced from each other and having sinusoidal characteristics, eighth means responsive to the signals from the fifth and seventh means for instantaneously shifting the phases of the first and second sinusoidal signals through particular angles at the particular relative positions along the first axis, ninth means responsive to the signals from the eighth means for producing instantaneous variations in the magnitudes and polarities of the accelerations between the first and second members at the particular relative positions along the first coordinate axis in response to the instantaneous shifts in the phase characteristics of the first and second sinusoidal signals to obtain the displacement of the first member relative to the second member along the first axis to the desired position, tenth means for providing third and fourth signals having particular phases displaced from each other and having sinusoidal characteristics, eleventh means responsive to the signals from the sixth and tenth means for instantaneously shifting the phase of the third and fourth sinusoidal signals through particular angles at the particular relative positions along the second axis, twelfth means responsive to the signals from the eleventh means for producing instantaneous variations in the magnitudes and polarities of the accelerations between the first and second members at the particular positions along the second coordinate axis in response to the instantaneous shifts in the phase characteristics of the third and fourth sinusoidal signals to obtain the displacement of the first member relative to the second member along the second axis to the desired position, thirteenth means for varying the frequency of the phase-shifted first and second sinusoidal signals to maintain such phase shifts during the periods of acceleration of the first member relative to the second member along the first axis, fourteenth means for varying the frequency of the phase-shifted third and fourth sinusoidal signals to maintain such phase shifts during the periods of acceleration of the first member relative to the second member along the second axis, and fifteenth means operatively coupled to the first, second, third and fourth means for co-ordinating the operation of the third and fourth means to represent the displacements simultaneously to be provided between the first and second members respectively along the first and second axes.

15. The combination set forth in claim 14 wherein the fifteenth means includes:

sixteenth means responsive to the characteristics of the signals provided by the first and second means for selecting a particular one of the first and second axes as the major axis in accordance with the relative displacements simultaneously to be provided between the first and second members respectively along the first and second axes, seventeenth means responsive to the characteristics of the signals provided by the first and second means for determining the relative ratio of the displacements simultaneously to be provided between the first and second members respectively along the first and second axes, and eighteenth means operatively coupled to the sixteenth and seventeenth means for simultaneously controlling the operation of the third and fourth means, in accordance with the selection of the particular one of the first and second axes as the major axis and the relative ratio of the displacements simultaneously to be provided between the first and second members along the first and second axes, in determining the magnitudes and polarities of the accelerations simultaneously to be provided between the first and second members along the first and second coordinate axes and in determining the particular relative positions during the desired displacements between the first and second members for obtaining such accelerations.

16. The combination set forth in claim 14 wherein the first and second members are disposed in displaced relationship to each other and are planar and magnetic and are constructed for magnetic interaction along the first and second coordinate axes respectively in accordance with the characteristics of the signals from the eighth and eleventh means for producing a simultaneous and continuous displacement between the first and second members respectively along the first and second axes in accordance with such interaction and wherein the ninth and twelfth means respectively produce magnetic forces simultaneously between the first and second members along the first and second axes with magnitudes and polarities respectively dependent upon the shifts in the phase characteristics of the signals from the eighth and eleventh means to obtain simultaneous variations in the magnitudes and polarities of the accelerations between the members along such axes and wherein the first and second means provide digital signals representing the desired displacements simultaneously to be provided between the first and second members simultaneously along the first and second coordinate axes and wherein the fifth means provides at the particular relative positions bursts of signals having a polarity and a count representative of the magnitudes and polarities of the accelerations to be provided between the first and second members along the first axis at the particular relative positions and the sixth means provides at the particular relative positions bursts of signals having a polarity and a count representative of the magnitudes and polarities of the accelerations to be provided between the first and second members along the second axis at the particular relative positions.

17. In a system for providing a controlled relative movement between two members along first and second coordinate axes, the combination of:

a first member, a second member disposed relative to the first member for simultaneous and independent and continuous and co-ordinated displacement between the first and second members along each of the first and second coordinate axes, first means operatively coupled to a particular one of the first and second members and cooperative with the other one of the first and second members for producing an interaction on a cyclic basis between the first means and the other member to provide an independent and arbitrary and continuous displacement between the first and second members along the first coordinate axis, second means operatively coupled to the particular one of the first and second members and cooperative with the other one of the first and second members for producing an interaction between the second means and the other member on a cyclic basis to provide an independent and arbitrary and continuous displacement between the first and second members along the second coordinate axis, third means for providing signals representing any desired displacement between the first and second members along the first coordinate axis to any desired position, fourth means responsive to the signals from the third means representing the desired displacement between the first and second members along the first coordinate axis for producing first signals representing desired changes in the magnitudes and polarity of the acceleration between the first and second members along the first coordinate axis, at particular positions along the first coordinate axis and at positions of extended range beyond the particular positions, in accordance with the signals representing such desired displacement, fifth means responsive to the signals from the fourth means and operatively coupled to the first means for producing variations in the interaction between the first means and the other member at the particular positions along the first coordinate axis and at the positions of extended range beyond the particular positions to produce the desired changes in the magnitude and polarity of the acceleration between the first and second members along the first coordinate axis, sixth means responsive to the first signals and operatively coupled to the first means for varying the rate of the cyclic interactions between the first means and the other one of the first and second members in accordance with the characteristics of such signals to provide controlled displacements between the first and second members along the first coordinate axis at a speed related to the rate of such cyclic interactions, seventh means for providing signals representing any desired displacement between the first and second members along the second coordinate axis to the desired position, eighth means responsive to the signals from the seventh means representing the desired displacement between the first and second members along the second coordinate axis for producing second signals representing desired changes in the magnitude and polarity of the acceleration between the first and second members along the second coordinate axis, at positions along the second coordinate axis and at the position of extended range beyond the particular positions, to provide the desired changes in the magnitude and polarity of the acceleration between the first and second members along the second coordinate axis, ninth means responsive to the signals from the eighth means and operatively coupled to the second means for producing variations in the interaction between the second means and the other member, at the particular positions along the second coordinate axis and at the positions of extended range beyond the particular positions, to provide the desired changes in the magnitude and polarity of the acceleration between the first and second members along the second coordinate axis, tenth means responsive to the second signals and operatively coupled to the second means for varying the rate of the cyclic interactions between the second means and the other one of the first and second members in accordance with the characteristics of such signals to provide controlled displacements between the first and second members along the second coordinate axis in accordance with the rate of such cyclic interactions, the first and second members being constructed to provide relative displacements along the first and second coordinate axes in synchronism with the cyclic interactions between the members along such axes, eleventh means responsive to the signals from the third and seventh means for selecting a particular one of the first and second axes as a major axis and the other one of the first and second axes as a minor axis in accordance with the relative values of the desired displacements along the first and second axes to the desired position, and twelfth means responsive to the signals from the eleventh means for controlling the operation of a particular one of the fifth and ninth means corresponding to the axis selected as the minor axis in accordance with the operation of the other one of the fifth and ninth means corresponding to the axis selected as the major axis.

18. The combination set forth in claim 17 wherein the twelfth means includes:

thirteenth means for selecting the particular one of the fifth and ninth means as the means to be controlled in accordance with the operation of the other one of the fifth and ninth means, fourteenth means responsive to the signals from the third and seventh means for producing a signal having characteristics representing the ratio of the desired displacements between the first and second members along the first and second axes to the desired position, and fifteenth means responsive to the signals from the fourteenth means for controlling the operation of the particular one of the fifth and ninth means simultaneously with, and proportionate to, the operation of the other one of the fifth and ninth means in accordance with the ratio of the desired displacements between the first and second members along the first and second axes to the desired position.

19. The combination set forth in claim 18, including, sixteenth means responsive to the signals representing the desired displacement between the first and second members along the major axis for producing signals representing the particular positions during such desired displacement for the production of changes in the magnitudes and polarity of acceleration between the first and second members along the first and second axes, and seventeenth means responsive to the signals from the sixteenth means and to the displacement between the first and second members to the particular positions along the first and second axes for controlling the operation of the fifth and ninth means at such particular positions and the extended ranges beyond such particular positons to change the magnitudes and polarity of acceleration between the first and second members along the first and second axes.

20. In a system for providing a controlled relative movement between two members along first and second co-ordinate axes to any desired position, the combination of:

a first member, a second member disposed relative to the first member for independent movement relative to the first member along the first and second co-ordinate axes, the first and second members being constructed to provide an indication of the position of the first and second members relative to each other in the first and second co-ordinate axes, first means disposed on the second member and selectively energizable and co-operative with the first member for producing a force between the first and second members in response to the selective energizing of the first means to provide an independent movement of the second member relative to the first member along the first axis, second means disposed on the second member and selectively energizable and cooperative with the first member for producing a force between the first and second members in response to the selective energizing of the second means to provide an independent movement of the second member relative to the first member along the second axis, third means for providing first sinusoidal signals having characteristics differing in phase from the relative positions of the first means and the first member by a value depending upon changes in the rate of displacement to be provided for the second member relative to the first member along the first co-ordinate axis, fourth means for providing second sinusoidal signals having characteristics differing in phase from the relative positions of the second means and the first member by a value dependent upon changes in the rate of displacement to be provided for the second member relative to the first member along the second co-ordinate axis, fifth means responsive to the displacement to be provided between the first and second members along the first co-ordinate axis to the desired position for producing, at particular positions in the displacement between the first and second members along the first co-ordinate axis, first bursts of signals having a count representing desired changes in the rate of displacement between the first and second members along the first co-ordinate axis, sixth means responsive to the displacement to be provided between the first and second members along the second coordinate axis to the desired position for producing, at particular positions in the displacement between the first and second members along the second co-ordinate axis, second bursts of signals having a count representing desired changes in the rate of displacement between the first and second members along the second co-ordinate axis, seventh means responsive to the first bursts of signals for obtaining a shift in the phase of the first sinusoidal signals in response to the count of such burst to vary the difference in phase between the first recurrent signals and the relative positions of the first means and the first member, eighth means responsive to the second bursts of signals for obtaining a shift in the phase of the second sinusoidal signals in response to the count of such bursts to vary the difference in phase between the second recurrent signals and the relative positions of the second means and the second member, ninth means responsive to the phase-shifted first sinusoidal signals from the seventh means for introducing such signals to the first means to energize the first means for the production of forces between the first and second members in response to the difference in phase between such signals and the relative positions of the first means and the first member, tenth means responsive to the phase-shifted second sinusoidal signals from the eighth means for introducing such signals to the second means to energize the second means for the production of forces between the first and second members in response to the difference in phase between such signals and the relative positions of the second means and the first member, eleventh means for varying the frequency of the phase-shifted first sinusoidal signals to maintain, through an extended range of displacement, the shifts in phase provided by the seventh means in the first sinusoidal signal, and twelfth means for varying the frequency of the phase-shifted second sinusoidal signals to maintain, through extended ranges of displacement, the shifts in phase provided by the eighth means in the second sinusoidal signals.

21. In the system set forth in claim 20:
the first member being in the form of a grid and the first means including a plurality of elements interacting with the grid on the first member to provide the relative movement between the first and second members along the first co-ordinate axis and the second means including a plurality of elements interacting with the grid on the first member to provide the relative movement between the first and second members along the second co-ordinate axis and thirteenth means operatively coupled to the fifth and sixth means for determining the relative displacements to be provided along the first and second axes to the desired position to provide for the operation of one of the fifth and sixth means in producing displacements between the first and second members along its axis as a major axis and for the operation of the other one of the fifth and sixth means in producing displacements between the first and second members along its axis as a minor axis.

22. In the system set forth in claim 20:
the first and second members having magnetic characteristics and the first means including first windings energizable to produce a magnetic force between the first member and the first means for providing a displacement of the second member relative to the first member along the first co-ordinate axis and the second means including second windings to produce a magnetic force between the first member and the second means for providing a displacement of the second member relative to the first member along the second co-ordinate axis, the first means being constructed to inhibit roation of the second member relative to the first member and the third and fourth means providing sinusoidal signals, fourteenth means operatively coupled to the fifth and sixth means for determining the ratio of the relative displacements to be provided between the first and second members respectively along the first and second axes to the desired position, and fifteenth means operatively coupled to the eleventh and twelfth means for controlling the relative counts of the signals in the bursts produced by the one of the fifth and sixth means and the other one of the fifth and sixth means in response to the ratio determined by the fourteenth means.

23. In a system for providing a controlled displacement between the first and second member along first and second coordinate axes to any desired position wherein the first and second members interact in response to sinusoidal signals to produce the relative displacement, the combination of, first means for providing first and second input digital data respectively representing desired displacements between the first and second members along the first and second coordinate axes to the desired position, second means responsive to the first input digital data for producing first digital signals having characteristics representing the relative displacement of the two members a particular distance along one of the coordinate axes in response to the first input digital data, third means for providing first and second signals having sinusoidal characteristics and a particular phase displacement relative to each other, fourth means responsive to the signals from the second means for producing, at particular displacements between the first and second members through the particular distance along the first coordinate axis to the desired position, digital signals having a count representing the magnitude of acceleration to be produced between the first and second members along the first coordinate axis, fifth means for shifting the phases of the first and second sinusoidal signals through a first particular angle in response to the count of the digital signals from the fourth means, sixth means responsive to the second input digital data for producing second digital signals having characteristics representing the relative displacement of the two members a particular distance along the other of the coordinate axes in response to the second input digital data, seventh means for providing third and fourth signals having sinusoidal characteristics and the particular phase displacement relative to each other, eighth means responsive to the signals from the sixth means for producing, at particular displacements between the first and second members through the particular distance along the second coordinate axis corresponding to the particular displacements between the first and second members along the first coordinate axis, digital signals having a count representing the magnitude of acceleration to be produced between the first and second members along the second coordinate axis, ninth means for shifting the phases of the third and fourth sinusoidal signals through a second particular angle in response to the count of the digital signals from the eighth means, tenth means for producing instantaneous variations in the magnitudes and polarities of the accelerations between the two members along the first coordinate axis in response to the instantaneous shifts provided by the fifth means in the phases of the first and second sinusoidal signals, eleventh means for producing instantaneous variations in the magnitudes and polarities of the accelerations between the two members along the second coordinate axis in response to the instantaneous shifts provided by the ninth means in the phases of the third and fourth sinusoidal signals, the two members being disposed in spaced relationship to each other and being constructed for interaction with each other to form a two-axis linear synchronous motor for controlled variations in the magnitudes of the accelerations and decelerations between the two members in response to the shifts in the phases of the first and second sinusoidal signals and the third and fourth sinusoidal signals, and twelfth means operatively coupled to the second and sixth means for co-ordinating the operation of the fourth and eighth means in accordance with the characteristics of the first and second digital signals, thirteenth means for producing changes in the frequency of the phase-shifted first and second sinusoidal signals to maintain such phase shifts through an extended range of displacement between the first and second members along the first coordinate axis, and fourteenth means for producing changes in the frequency of the phase-shifted third and fourth sinusoidal signals to maintain such phase shifts through an extended range of displacement between the first and second members along the second coordinate axis.

24. The system of claim 23 wherein the first member is a platen and the second member is disposed in contiguous relationship to the platen and wherein the twelfth means includes fifteenth means for selecting a particular one of the first and second axes as the major axis and the other axis as the minor axis in response to the relative characteristics of the first and second digital signals and further includes sixteenth means for determining the ratio of the relative displacements to be provided between the first and second members along the first and second axes to the desired position and further includes seventeenth means for controlling the relative count of the signals produced by the fourth and eighth means in response to the ratio determined by the sixteenth means.

25. In a system for providing a controlled relative movement along a particular axis to any desired position, the combination of:

a first member, a second member disposed relative to the first member for movement relative to the first member along the particular axis, first means disposed on the second member and selectively energizable and cooperative with the first member for producing a force between the first and second members in response to the selective energizing of the first means to provide a movement of the second member relative to the first member along the particular axis, second means for providing first sinusoidal signals having a particular phase displacement relative to each other and having characteristics differing in phase from the relative positions of the first means and the first member by a value depending upon changes in the rate of displacement to be provided for the second member relative to the first member along the particular axis, third means responsive to the displacement to be provided between the first and second members along the particular axis to the desired position for producing, at particular positions in the displacement between the first and second members along the particular axis, first bursts of signals having a count representing desired changes in the rate of displacement between the first and second member along the particular axis, fourth means responsive to the first bursts of signals and operatively coupled to the second means for obtaining shifts in the phase of the first sinusoidal signals in response to the count of the signals in the first burst to vary the difference in phase between the first recurring signals and the relative positions of the first means and the first member, fifth means responsive to the phase-shifted first sinusoidal signals for introducing the first sinusoidal signals to the first means to energize the first means for the production of forces between the first and second members in response to the difference in phase between the phase-shifted first sinusoidal signals and the relative positions of the first means and the first member, and sixth means for varying the frequency of the phase-shifted first sinusoidal signals to maintain such shifts in phase through extended displacements between the first and second members along the particular axis.

* * * * *